United States Patent [19]

Scott et al.

[11] Patent Number: 5,393,188
[45] Date of Patent: Feb. 28, 1995

[54] PALLET STORAGE SYSTEM

[76] Inventors: Todd Scott, 19 Jennifer Crescent, Sharon, Ontario; Tony Evers, 101 Palmer Circle, R.R. #2, Bolton, Ontario, L7E 5R8; Kevin Minkhorst, 217 Bishop Drive, Barrie, Ontario, L4N 6X5, all of Canada

[21] Appl. No.: 167,565

[22] Filed: Dec. 14, 1993

[30] Foreign Application Priority Data

Jun. 15, 1993 [CA] Canada .................. 2,098,433

[51] Int. Cl.⁶ .............................................. A47F 5/00
[52] U.S. Cl. .................................. 414/276; 414/286; 211/151
[58] Field of Search ............... 414/276, 286; 211/151, 211/162, 59.2

[56] References Cited

U.S. PATENT DOCUMENTS

| | | | |
|---|---|---|---|
| 4,155,462 | 5/1979 | Bendel | 211/151 |
| 4,197,047 | 4/1980 | Haldimann | 414/276 |
| 4,341,313 | 7/1982 | Doring | 414/276 X |
| 4,462,500 | 7/1984 | Konstant et al. | 414/276 X |
| 4,613,270 | 9/1986 | Konstant et al. | 414/286 X |
| 4,687,404 | 8/1987 | Seiz et al. | 414/276 |
| 4,773,546 | 9/1988 | Konstant | 211/151 |
| 4,915,240 | 4/1990 | Konstant | 211/151 |
| 4,949,852 | 8/1990 | Allen | 211/151 |
| 4,955,489 | 9/1990 | Allen | 211/151 |
| 4,982,851 | 1/1991 | Konstant | 414/276 X |
| 4,988,251 | 1/1991 | Kinney | 414/276 |
| 5,080,241 | 1/1992 | Konstant | 414/276 X |
| 5,117,990 | 6/1992 | Krummell et al. | 211/151 |
| 5,137,159 | 8/1992 | Collins et al. | 211/151 |
| 5,141,118 | 8/1992 | Gay | 211/151 |
| 5,184,738 | 2/1993 | Allen | 414/276 X |
| 5,285,909 | 2/1994 | Slater | 211/151 |
| 5,312,004 | 5/1994 | Krummell et al. | 414/276 X |

*Primary Examiner*—David A. Bucci
*Attorney, Agent, or Firm*—Zarley, McKee, Thomte, Voorhees & Sease

[57] ABSTRACT

In a storage system comprising rows of shelves defining lanes for the storage of cartons or pallet loads and like wherein the shelf lanes are adapted to receive inventory loads one behind the other, a push-pack system comprising a pair of track adapted for wheels to roll upon the inner and outer edges of the top surface thereof, a first cart with a rectangular frame with wheels to ride on one edge of the tracks, a second cart having a U-shaped frame adapted to receive the first cart nested within the frame at approximately the same elevation and having wheels to ride upon the other edges of the track. Variations may provide for three or four carts providing storage of loads four or five pallets deep.

20 Claims, 6 Drawing Sheets

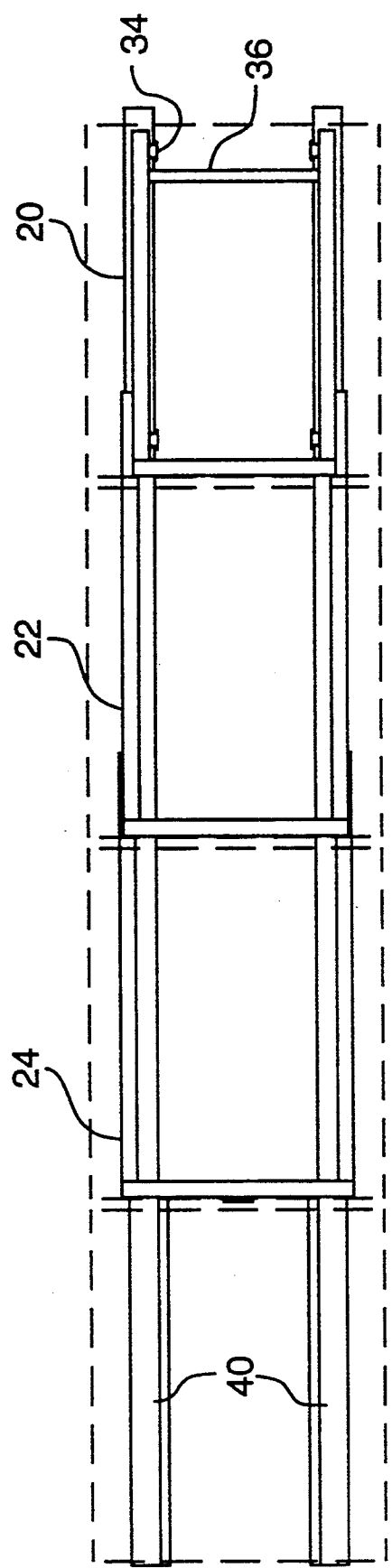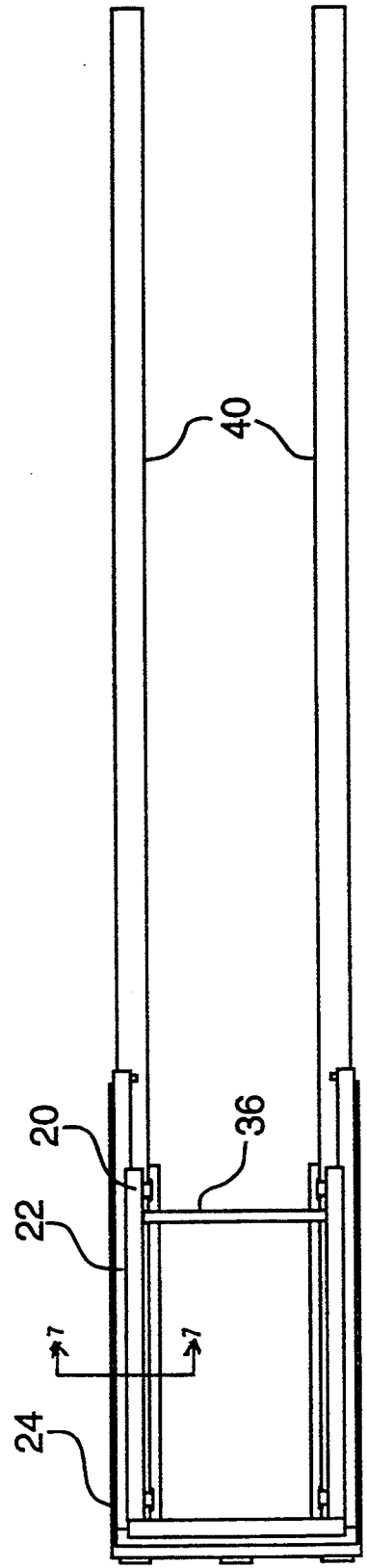
FIG.4.
FIG.3.

3,393,188

PALLET STORAGE SYSTEM

BACKGROUND OF THE INVENTION

This invention relates to improvements in warehouse storage systems. In particular, it relates to improvements in storage systems designed to store large numbers of packages or cartons on racks or shelving by means of pallets.

Modern manufacturing techniques with large production runs, and other factors, have led to the requirement that stocks and inventory be stored in warehouses. The increasing technological sophistication and high quality of manufactured products has led to the need to store stocks and inventory in well built, clean, atmospherically controlled warehouses which are consequently more expensive. The demand for efficiency in modern manufacturing and marketing systems has led to the requirement that a wide variety of stocks and inventory be warehoused where they can be quickly and efficiently stored and retrieved as needed.

The result is that warehouses have become neat, efficient, well built and expensive. It is therefore important in the warehousing industry to make maximum use of these facilities by creating as much occupiable storage space as possible within a given warehouse or facility. In other words it is important to minimize the unoccupied storage space, such as access corridors and travelways for loading vehicles, etc.

The modern trend has been to provide racks on which shelves are provided to accept pallet-loaded containers or cartons and which are often three, four, and five levels high. These pallet supported cartons or containers are typically placed on shelves or retrieved from shelves by fork lift trucks or other transfer vehicles.

It is obvious that if every row of cartons requires a corridor in which a transfer vehicle can travel, the amount of warehouse space devoted to storage can never be more than approximately fifty percent of the available area. As a result racks with shelving have been developed which will accept three or four pallets located one behind the other so that one corridor will enable a transfer vehicle to access three or four times as much storage space. In order to employ this concept, it is necessary to provide means whereby pallet supported containers can be placed on a shelf and moved to the back a depth of two or three times the horizontal dimension of the pallet. These systems are commonly known as push back racks. Many of these systems use a series of rollers or wheels like loading ramps which will allow the pallets to be pushed to the far end of the lane or shelf and frequently they are inclined so that the pallets will flow by gravity to the front of the shelf as they are retrieved.

More modern systems have been developed which employ one or a series of carts which travel within the laneway of the shelf racks and are designed so that a pallet is placed on a cart and each subsequent pallet then pushes the previous pallet towards the back end of the shelf.

Since all of these carts must at some point travel to the front end of the shelf for loading, it is important that the carts be designed so that they can be all situated at the same location (i.e. at the front) on the shelf without obstructing or colliding with each other. Therefore, many of the systems designed to-date have achieved a degree of volumetric efficiency in the use of storage spaces in warehouses but in doing so have arrived at a rather complex and duplicated series of tracks to accommodate the wheels of two or more carts moving within the same shelf compartment or lane.

Furthermore, in order to permit two or more carts to occupy the same position on a shelf, they are structured so that the bed or platform of each cart is spaced above or below the next adjacent cart and this creates a certain loss of vertical dimension that results in a space occupied by the head room required for the carts.

It is therefore the purpose of this invention to provide a warehouse storage system of the push back type which can handle a row of three or four or more pallets on a single shelf. It is especially the purpose of this invention to provide such a system in which a series of two or three carts are provided to transfer pallets towards the end of the shelf safely and efficiently. It is also the purpose of this invention to provide a design for a push back storage system in which the carts are so designed that they will cooperate in a manner which occupies a minimum amount of vertical spacing between the bottom of the shelf and the top of the cart.

It is also the purpose of this invention to provide a push back system in which a series of carts may travel safely on tracks of a relatively simple, structurally strong, and inexpensive design.

SUMMARY OF THE INVENTION

These objects and other advantages are achieved by the present invention which comprises at least one pair of tracks in which each track has a horizontal top surface of sufficient dimensions that the wheels of a cart may ride along opposite edges without colliding or interfering with each other, and at least two carts designed so that one cart has a U-shaped frame into which the other cart may nest such that the vertical spaced occupied by one cart overlaps the vertical space occupied by the other cart.

Preferably, the wheels of the U-shaped cart are prevented from leaving the tracks by a guide flange.

Preferably, the carts are prevented from lifting off the tracks by means of an anti-lift (which is restrained by a corresponding plate).

BRIEF DESCRIPTION OF THE DRAWINGS

The invention may be better understood by a detailed description of one embodiment thereof with reference to the attached drawings in which:

FIG. 3 is a plan view of a single shelf lane with a series of carts and tracks at the front end thereof;

FIG. 4 is a plan view of the shelf in FIG. 3 with the series of carts extended to the back;

DETAILED DESCRIPTION OF THE PREFERRED EMBODIMENT

Figure 1:
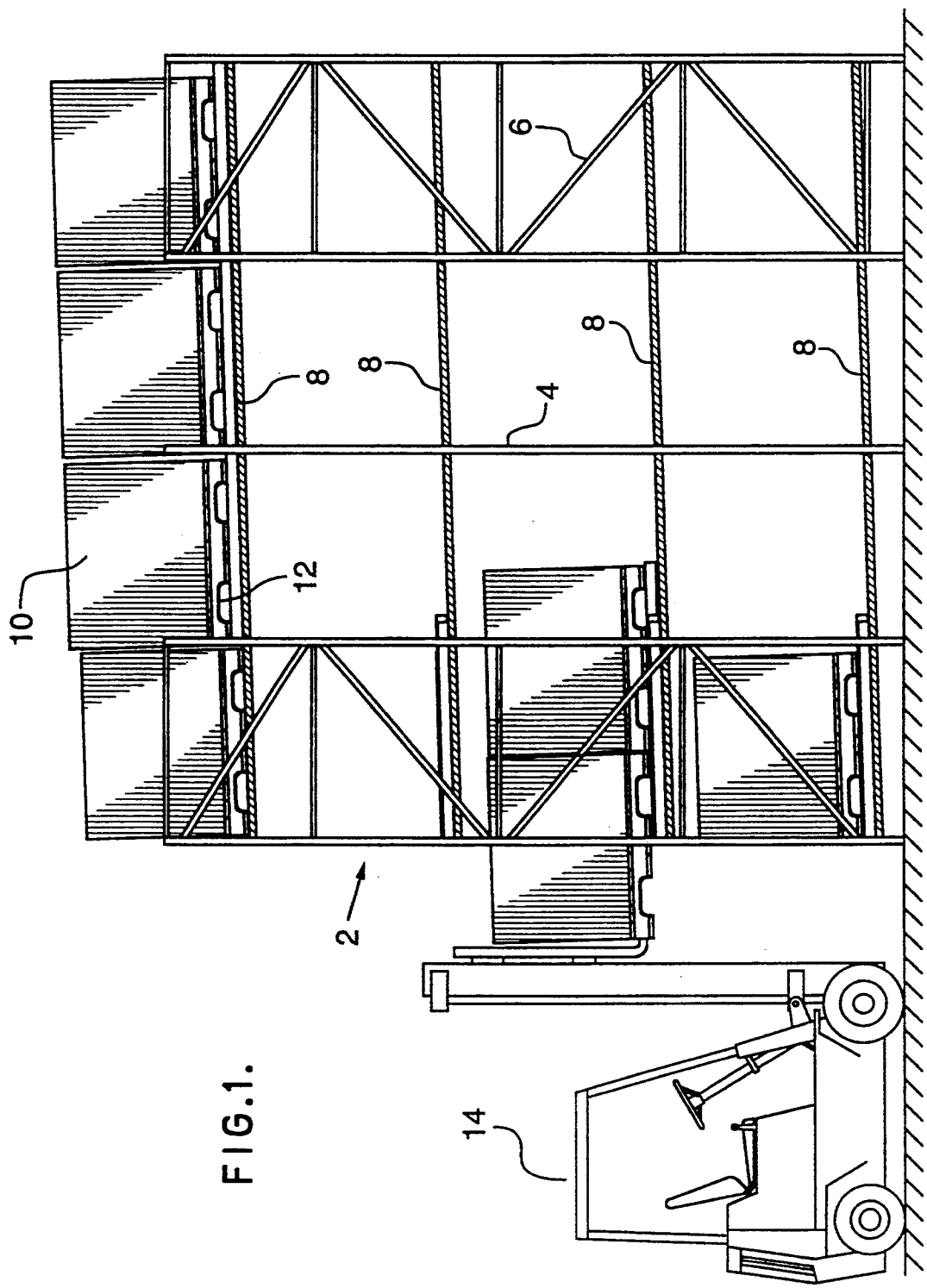
FIG. 1 is a side elevation view of a typical push back storage rack system incorporating the present invention.

In the embodiment shown in the drawings, FIG. 1 illustrates a typical set of racks 2 with vertical uprights 4 and structural braces 6 which support a set of four shelves 8 which may or may not constitute a floor or platform. Each shelf is designed to hold up to four cartons or containers 10 supported on pallets 12.

These cartons are placed on the shelves by means of a transfer vehicle, such as the fork lift trucks 14 illustrated in FIG. 1, which is located in, and travels along, corridors between various sets of racks of the type illustrated in FIG. 1.

In this sort of system a single pallet containing a carton would be placed at the front of a lane as illustrated at the bottom shelf. When a second pallet is placed on the shelf the loading vehicle simply pushes the first pallet backwards, as illustrated in FIG. 1 and deposits the second at the front. In the illustrated system a total of four pallets may be installed as shown on the top shelf. The first three are pushed successively rearward on the shelf (by means of carts which will be described later) by each subsequent pallet, and the last pallet is placed on the shelf at the front.

Figure 2:
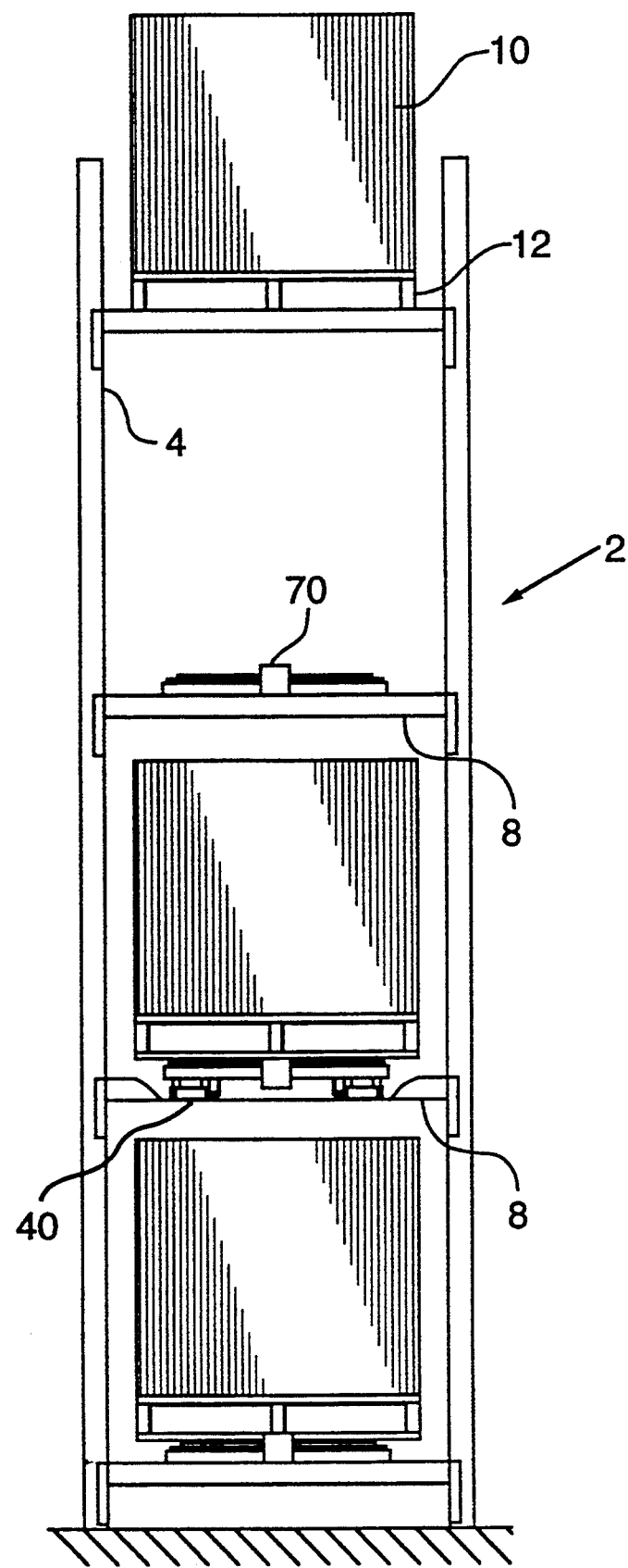
FIG. 2 is a front elevation view of the four level, single column of shelf lanes in FIG. 1.

FIG. 2 illustrates the front elevation of the four shelves in FIG. 1, each shelf providing a lane into which four containers on pallets may be placed. It will be realized that the single set of four shelves illustrated in FIG. 2 would typically be repeated on either side for an indefinite distance so as to provide a bank of shelves, four high, and spaced side by side along a corridor or travelway from which the loader 14 can access the shelves through the front opening illustrated in FIG. 2.

In a rack of shelves, as illustrated in FIGS. 1 and 2, if the shelf 8 were merely a floor or platform, the pallets might be pushed to the back of the shelf, by overcoming friction, but would then be inaccessible for retrieval. It is therefore important in such a system to provide means whereby the pallets can be pushed with reasonably small forces to the back and then will travel forward again when the foremost pallets are removed.

In some of the prior art designs this is accomplished by providing a set of rollers at the floor of the shelf which is inclined upwardly to the back. In this sort of system the travel of the pallets is hard to control and safety is a concern.

In other systems a series of carts are provided which travel on the shelf to carry the pallets from the front to the back and vise versa. The present system employs a series of carts of a unique and advantageous design.

Each shelf 8 (which may have a floor or platform, or merely a series of horizontal struts extending across the racks and defining the bottom of each lane), is inclined so that pallets must be pushed uphill, against gravity, to the back when they are installed and will roll down towards the front as they are retrieved.

Figure 5:
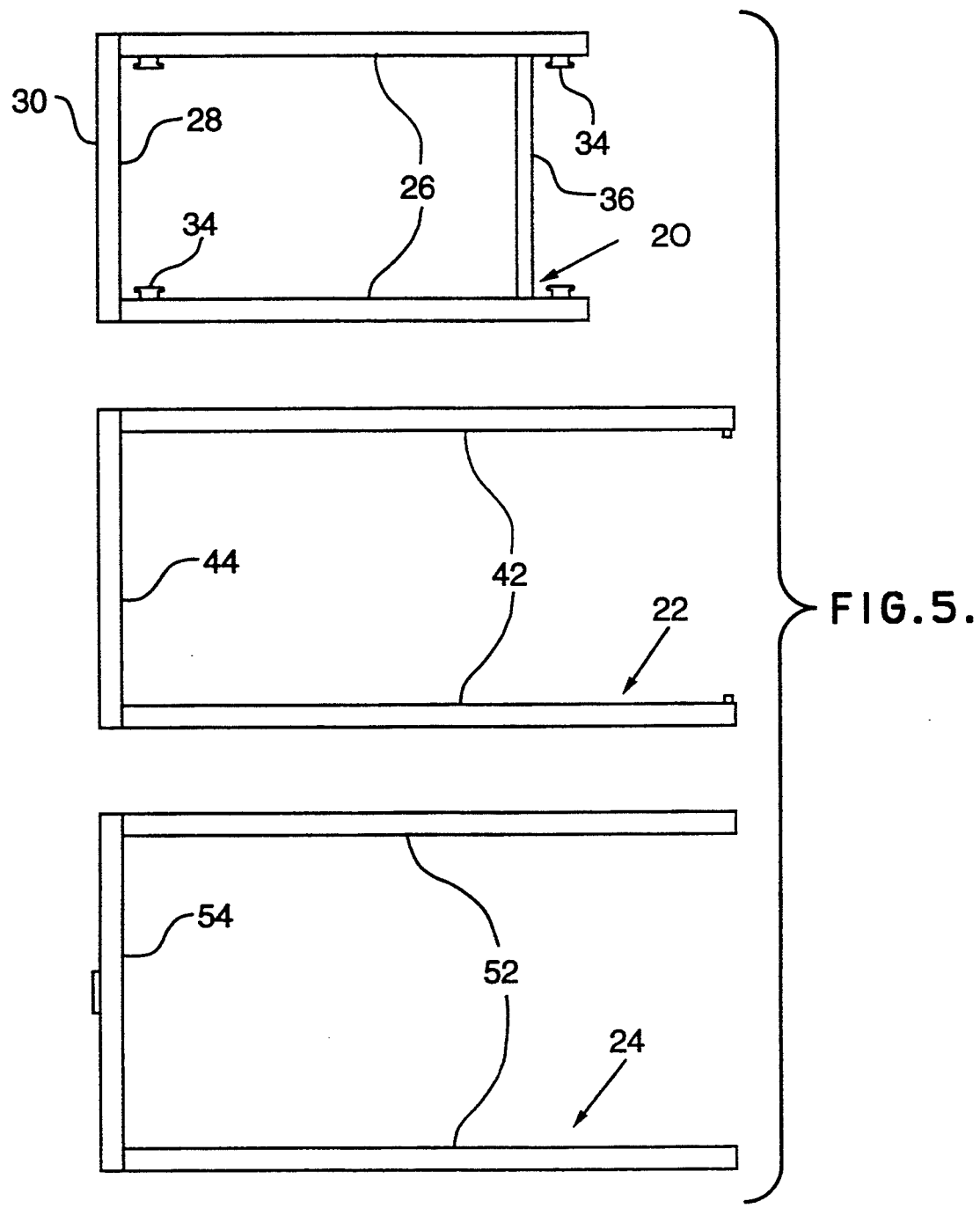
FIG. 5 is a view of the carts of FIGS. 3 and 4 separated for better illustration.

Each illustrated shelf carries a pair of inclined tracks 40 on which travel the wheels of a series of carts illustrated in FIGS. 3, 4 and 5. In FIG. 3 the carts are shown nested together at the front of the shelf to the left of the drawing. In FIG. 4 the carts are shown extended or traversed to the second, third, and fourth locations as they would be spaced in a shelf which is fully loaded, as illustrated at the top in FIG. 1.

In FIG. 5 the top cart 20, middle cart 22, and bottom cart 24 are illustrated separately. The structure of these carts includes a frame of generally rectangular proportions with wheels, as can be seen from the illustrations in FIG. 5 and the cross-sectional drawing of FIG. 7. The top cart comprises a frame with side beams 26 and front beams 28 constructed of angle iron having a top horizontal flange 30, and a vertical flange 32 extending downwardly from the inside edge of the horizontal flanges. A brace 36 extends between the sides of the frame near the rearward ends thereof in the top cart. A set of four wheels 34 are mounted to the vertical flange 32 near the corners of the cart and extend inwardly from the side beams. These wheels have flanges on the inboard sides thereof and are adapted to run along the top of the rail 40 at the inboard edge thereof as illustrated in FIG. 7.

Figure 7:
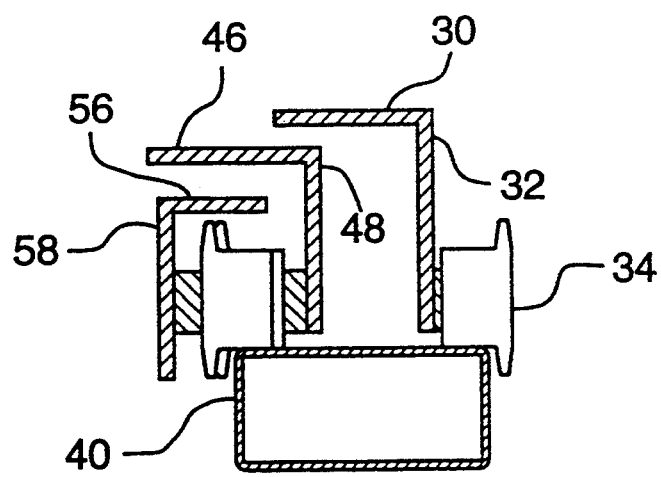
FIG. 7 is a cross-sectional view of the carts in FIG. 3 and a supporting track.

The middle cart 22 has similar side beams 42 and a front beam 44 which are similarly composed of angle iron having horizontal flanges 46 and vertical flanges 48 extending downwardly from the inside edge of the horizontal flanges, as illustrated in FIG. 7. The vertical flanges have four wheels mounted to them near the four corners of the cart but these wheels extend outboard from the vertical flanges 48 and have an outboard flange thereon so that the wheels ride on the top of the track 40 along the outboard edge of the tracks.

The bottom cart 24 also has side beams 52 and a front beam 54 made of angle iron with a horizontal flange 56 and a vertical flange 58. However, the vertical flanges 58 extend downwardly from the outside edge of the horizontal flanges and have four wheels mounted thereon extending inwardly from the vertical flange. These wheels have an outboard flange so that the wheels ride on the top track 40 along the outboard edge thereof (like the middle cart).

To permit nesting neither of the middle or bottom carts have a brace similar to 36.

Figure 6:
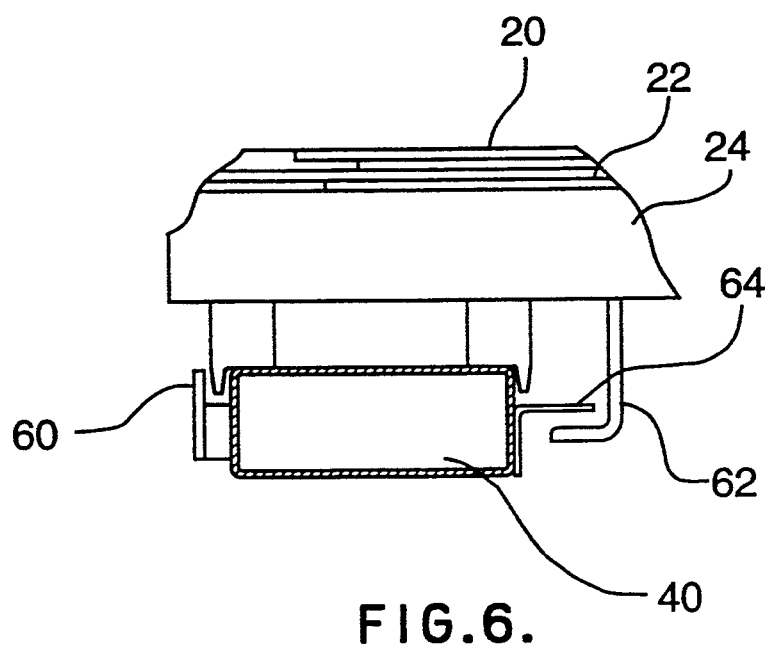
FIG. 6 is an end view of a portion of the carts and tracks of FIG. 3 installed on a shelf as in FIG. 3.

It should be noted that the vertical flange 48 of the middle cart is long enough that the horizontal flange 46 rests above the horizontal flange 56 of the bottom cart. Similarly, the vertical flange 32 of the top cart is dimensioned so that the horizontal flange 30 rides above the horizontal flange 46 of the middle cart. Thus, although there are three carts designed to nest and occupy the same position (normally at the front of the shelf), the vertical spacing from the track to the top of the horizontal flange of the top cart is not much greater than the vertical dimension of a single cart (as can be seen in FIG. 6). Thus, not much head room is occupied by carts of this design.

In addition, the track as illustrated in cross-section in FIG. 7, is a rectangular tubular member, and has enough horizontal dimension to allow one set of wheels to run along the inboard edge and another set, or two sets, to run along the outboard edge of a single track without interfering with each other. Although the respective wheels of the middle cart and bottom cart both run on the same edge of the track 40, they are spaced so that in the nested position illustrated in FIG. 3 the wheels of the middle cart are spaced just slightly to the rearward of the corresponding wheels of the lower cart. And because of the length of the middle cart and bottom cart, as illustrated in FIG. 5, the carts may be rolled to their extended or spaced position illustrated in FIG. 4 in which the frontmost wheels of the middle cart will be located slightly forward of the rearmost wheels of the bottom cart. In other words the lengths of the middle and bottom carts are chosen so that those carts may move from the nested position to the extended position, even though their wheels are running on the same edge of the track. In addition, because the top cart is running on the opposite edge of the tracks, it may move to the rearmost position without interfering or conflicting with the movement of the other carts.

FIG. 6 illustrates the relative position of frames of the carts in the nested position and the relatively low profile of the three carts. In addition, because the middle cart and bottom cart, unlike the top cart, do not have a brace similar to 36, the carts can nest within the vertical profile of each other rather than being spaced entirely above or below each other. It is considered prudent to guard against the possibility of the rearmost wheels moving apart and coming off the tracks. Therefore, as illustrated in FIG. 6, a guide flange 60 is provided to prevent the wheels of the middle and bottom cart from moving excessively to the outside.

Preferable, as an additional safety feature, each cart has an anti-lift bracket 62 which cooperates with a corresponding plate 64 on the tracks near the front end to prevent the carts from being accidentally lifted off the rails by the loader which might allow the carts to run off the shelf at the forward end. In normal operation barrier means are provided to stop the carts from running beyond the front end of the tracks.

Figure 8:
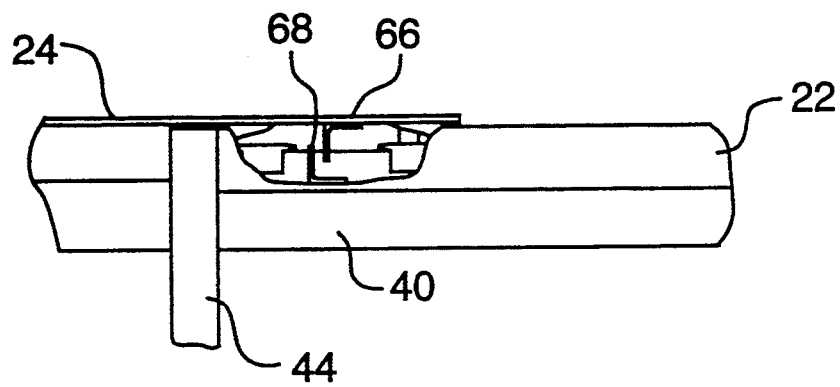
FIG. 8 is a cut away illustration of the structure of the carts in FIG. 4.

As illustrated in FIG. 8, linkage means are provided by a projection 66 on the bottom cart and 68 on the middle cart which overlap and meet each other in the direction of travel so that the middle cart will not move beyond the desired spacing relative to the bottom cart. Similar linkage means, not illustrated, ought preferably to be provided between the top and middle carts. This linkage means will prevent the accidental separation of the carts which could allow the top cart to remain stuck at the upper rearward end of the track while the front three positions are unloaded thus creating the risk that the top cart could run unrestrained the whole length of the shelf and cause an accident.

An additional safety feature is illustrated in FIG. 2 where a push plate 70 is shown projecting upwards from the front beam of the bottom cart. This forces the loader operator to clear the cart before placing a pallet in the shelf. It also serves to indicate (by its absence) when a lane is full. In addition, it serves as a stop to prevent a pallet being pulled off when the loader is backed away, or otherwise shifting beyond the front edge of the shelf. It also tends to prevent a last pallet from nesting on the front of the bottom cart which would cause it to be deposited at an inclined position.

Figure 9:
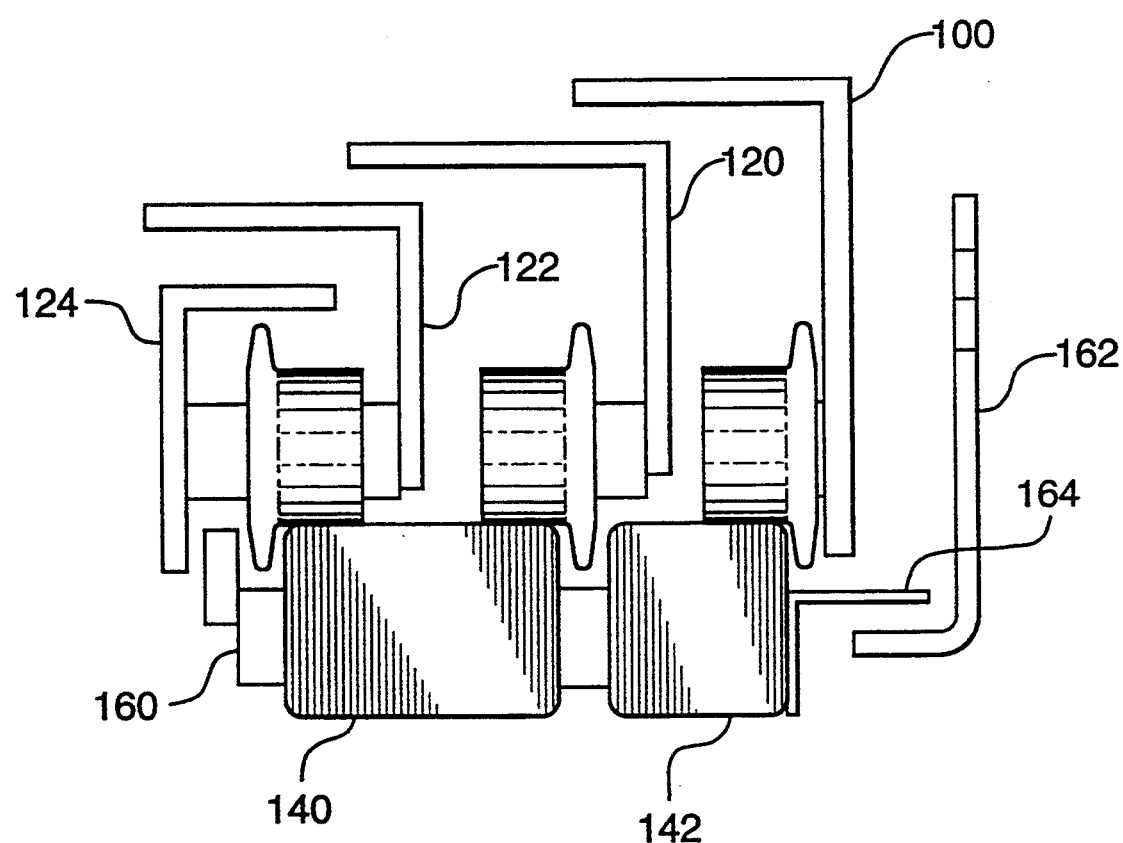
FIG. 9 is a cross-section of an alternative design for additional carts and trucks.

FIG. 9 illustrates a cross-section of an alternative design which might be used if a shelf was intended to carry five pallets deep. In this design a first track 140 would carry a bottom cart 124 and a lower cart 122 on the outside edge and would carry an upper cart 120 on the inside edge while an auxiliary track 142 would carry a fourth or top cart 100. As in the previous design, a guard flange 160 is provided and the second rail 142 provides a guide to the wheels of the upper cart 120 (the top cart having a brace to prevent outward movement of the wheels). As in the other design an anti-lift bracket 162 is provided to engage the plate 164 to prevent lift off of the carts.

In operation, an empty storage shelf, such as the third level in FIG. 1, will normally have the carts resting in nested position at the front or loading end, as illustrated in FIG. 3.. When material is to be loaded in the racks the transfer vehicle, such as the fork lift truck 14, can put a first pallet load at the front end of the shelf, as illustrated in the lower level in FIG. 1, where it will rest on the horizontal flanges of the frame of the top cart 20. When it is desired to put a second pallet load on the shelf the vehicle operator uses the second pallet load to push the first pallet, and the cart on which it rests, rearwardly (as illustrated at the second level in FIG. 1) until the second pallet rests on the middle cart. Subsequently, a third pallet may be used to push the first and second carts rearwardly and is deposited on the top flanges of the bottom cart. Lastly, the fourth pallet load is used to push all three carts rearwardly and the fourth pallet is deposited on the shelf or the tracks without any cart beneath it.

When it is desirable to retrieve the stored articles the opposite sequences followed, and as the foremost pallet is withdrawn, the remaining rearward pallets roll forward on their respective carts to the frontmost position on the shelf ready for subsequent removal.

Thus, by means of the design of the present invention, an efficient use of warehouse space may be achieved by enabling the storage of containers or cartons on pallets in racks which are three, four or five levels high and three or four or five pallet spaces deep in a series of side by side racks which extend as long as the warehouse or corridor permits. In this fashion three or four rows of pallet loads may be serviced from a single corridor rather than having an unoccupied corridor space for each pallet depth.

Furthermore, by virtue of the design of the carts in the present invention, the frames of the respective carts may nest within each other so that the overall head room occupied by the carts is much less than the cumulative height of three carts would be if the entire frame of each cart had to pass over or under the next adjacent cart. The spacing of one cart may be one-half inch above the one beneath.

Dimensions for the shelving, tracks, and carts are a matter of design choice but will generally be dictated by industry standards for the size of pallets or containers, etc.

Furthermore, because of the design of the present invention, three or four carts may be made to ride on a relatively simple track system. A track system of this design does not require the wheels to run in grooves where debris may accumulate and interfere with the motion of the carts.

Therefore, a storage system in accordance with the present invention is both easy and economical to construct, and compact enough to provide significant savings in the volume available for storage space.

It will, of course, be realized that numerous variations and modifications of the illustrated embodiment may be employed without departing from the inventive concept herein.

We claim:

1. In a storage system comprising rows of shelves defining lanes for the storage of cartons, pallet loads, and packages, wherein the shelf lanes having front and back ends are adapted to receive more than one load of inventory positional one behind the other from front to back, a push-back system comprising;

at least one pair of tracks running from front to back in each shelf lane, each track having a substantially flat horizontal top surface for wheels to roll upon, and having inside edges facing a center of said lane and outside edges facing sides of said lane;

a first cart having a rectangular shaped frame and having at least one wheel on each side mounted to said frame and adapted to roll on the top of each said track;

a second cart adapted to move relative to said first cart and having a U-shaped frame open at one end to permit said first cart to nest within said second cart frame, and having at least one wheel on each side adapted to run along the top of each of said tracks respectively;

the wheels of one cart being adapted to run along the inside edges of said tracks and the wheels of the other cart being adapted to roll along the outside edges of said tracks;

the top surface of said tracks being wide enough to permit wheels on the inside and outside edges to pass without colliding.

2. A system as claimed in claim 1, including a third cart adapted to move relative to said first and second cart and having a frame open at one end to permit said first and second carts to nest within said third cart frame and having at least one wheel adapted to run along one pair of corresponding edges of said tracks respectively;

said wheels being longitudinally spaced so that they do not collide with the wheels of other carts on the same pair of corresponding edges of said tracks throughout the relative movement of said carts.

3. A system as claimed in claim 2, including a second pair of tracks parallel and adjacent to said first pair;

a fourth cart having a U-shaped frame open at one end and adapted to permit the first, second and third carts to nest within said fourth cart frame;

said fourth cart frame having wheels to adapted to run along corresponding edges of the second pair of tracks respectively;

said second pair of tracks and said fourth cart wheels being spaced to avoid collision with the wheels of the other carts during the relative movement of said carts.

4. A system as defined in claim 1 in which said wheels have vertical flanges adapted to bear against and maintain said wheels adjacent to the respective inner and outer edges of the top surface of said tracks respectively.

5. A system as claimed in claim 1 in which said wheels have vertical flanges adapted to bear against and maintain said wheels adjacent to the respective inner and outer edges of the top surface of said vertical track respectively, and said tracks have vertical flanges adjacent to the track edges on the opposite side of said wheel flanges from said track edges to prevent said wheels running off the top surface of said tracks.

6. A system as claimed in claim 1, including means to prevent said carts from being lifted off said tracks, said means comprising a plate extending horizontally from said tracks, and a second plate, mounted to said carts, a portion of which extends horizontally beneath said first plate.

7. A system as claimed in claim 1 in which said tracks are inclined upwardly from front to rear in said shelf lanes.

8. A system as claimed in claim 1, including a push-plate upstanding from a front end of the cart nearest the front end of the shelf.

9. A system as defined in claim 2 in which said wheels have vertical flanges adapted to bear against and maintain said wheels adjacent to the respective inner and outer edges of the top surface of said tracks respectively.

10. A system as claimed in claim 2 in which said wheels have vertical flanges adapted to bear against and maintain said wheels adjacent to the respective inner and outer edges of the top surface of said vertical track respectively, and said track have vertical flanges adjacent to the track edges on the opposite side of said wheel flanges from said track edges to prevent said wheels running off the top surface of said tracks.

11. A system as claimed in claim 2, including means to prevent said carts from being lifted off said tracks, said means comprising a plate extending horizontally from said tracks, and a second plate, mounted to said carts, a portion of which extends horizontally beneath said first plate.

12. A system as claimed in claim 2 in which said tracks are inclined upwardly from front to rear in said shelf lanes.

13. A system as claimed in claim 2, including a push-plate upstanding from the front end of the cart nearest the front end of the shelf.

14. A system as defined in claim 3 in which said wheels have vertical flanges adapted to bear against and maintain said wheels adjacent to the respective inner and outer edges of the top surface of said tracks respectively.

15. A system as claimed in clam 3 in which said wheels have vertical flanges adapted to bear against and maintain said wheels adjacent to the respective inner and outer edges of the top surface of said vertical track respectively, and said tracks have vertical flanges adjacent to the track edges on the opposite side of said wheel flanges from said track edges to prevent said wheels running off the top surface of said tracks.

16. A system as claimed in claim 3, including means to prevent said carts from being lifted off said tracks, said means comprising a plate extending horizontally from said tracks, and a second plate, mounted to said carts, a portion of which extends horizontally beneath said first plate.

17. A system as claimed in claim 3 in which said tracks are inclined upwardly from front to rear in said shelf lanes.

18. A system as claimed in claim 3, including a push-plate upstanding from the front end of the cart nearest the front of said shelf.

19. A system, as claimed in claims 1, 2 or 3, in which a frame of said carts is constructed of angle iron having horizontal and vertical flanges, horizontal flanges of one cart overlapping the horizontal position of the horizontal flanges of at least one other cart.

20. A system, as claimed in claims 1, 2 or 3, in which a frame of said carts is constructed of angle iron having horizontal and vertical flanges, vertical flanges of one cart overlapping the vertical position of the vertical flanges of at least one other cart.

* * * * *